United States Patent
Matsuoka

(10) Patent No.: US 11,739,175 B2
(45) Date of Patent: Aug. 29, 2023

(54) CURABLE RESIN COMPOSITION AND CURED MATERIAL

(71) Applicant: THREEBOND CO., LTD., Tokyo (JP)

(72) Inventor: Hiroto Matsuoka, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 0 days.

(21) Appl. No.: 17/272,837

(22) PCT Filed: Jul. 1, 2019

(86) PCT No.: PCT/JP2019/026107
§ 371 (c)(1),
(2) Date: Mar. 2, 2021

(87) PCT Pub. No.: WO2020/049846
PCT Pub. Date: Mar. 12, 2020

(65) Prior Publication Data
US 2021/0214485 A1 Jul. 15, 2021

(30) Foreign Application Priority Data
Sep. 4, 2018 (JP) ................................. 2018-165221

(51) Int. Cl.
*C08F 290/06* (2006.01)
*C09D 133/16* (2006.01)
*C09J 133/16* (2006.01)

(52) U.S. Cl.
CPC ........ *C08F 290/067* (2013.01); *C09D 133/16* (2013.01); *C09J 133/16* (2013.01)

(58) Field of Classification Search
None
See application file for complete search history.

(56) References Cited

U.S. PATENT DOCUMENTS

| | | | | |
|---|---|---|---|---|
| 4,511,209 A * | 4/1985 | Skutnik | ................. | G02B 1/048 385/124 |
| 5,024,507 A * | 6/1991 | Minns | ................ | G02B 6/02033 430/286.1 |
| 5,690,863 A * | 11/1997 | Schuman | ........... | G02B 6/02033 252/582 |
| 6,037,014 A * | 3/2000 | Edgington | ............... | C09D 4/00 427/591 |
| 6,376,572 B1 | 4/2002 | Turri | | |
| 6,703,463 B2 * | 3/2004 | Holguin | .................. | C08F 20/22 428/421 |
| 8,552,083 B1 * | 10/2013 | Taranekar | ......... | C08G 18/8116 528/65 |
| 10,216,026 B2 | 2/2019 | Shinya et al. | | |
| 2002/0136526 A1 | 9/2002 | Pottebaum et al. | | |
| 2009/0274902 A1 | 11/2009 | Kume | | |
| 2010/0324224 A1 * | 12/2010 | Tanaka | ................. | C08F 290/12 525/293 |
| 2012/0135210 A1 * | 5/2012 | Walker, Jr. | ............. | G02B 1/111 977/773 |

FOREIGN PATENT DOCUMENTS

| | | | | |
|---|---|---|---|---|
| CN | 104761679 A | | 7/2015 | |
| CN | 105482680 A | * | 4/2016 | ......... C08G 18/5015 |
| CN | 105482680 B | * | 8/2017 | ......... C08G 18/5015 |
| JP | H05-19214 A | | 1/1993 | |
| JP | H05-45612 A | | 2/1993 | |
| JP | H10-237392 A | | 9/1998 | |
| JP | 2001-048943 A | | 2/2001 | |
| JP | 2001-183502 A | | 7/2001 | |
| JP | 2001-188101 A | | 7/2001 | |
| JP | 2002-322454 A | | 11/2002 | |
| JP | 2009-132800 A | | 6/2009 | |
| JP | 2009-263600 A | | 11/2009 | |
| JP | 5397686 B2 | * | 1/2014 | |
| JP | 2016-103030 A | | 6/2016 | |

(Continued)

OTHER PUBLICATIONS

PCT, International Search Report for the corresponding patent application No. PCT/JP2019/026107, dated Oct. 1, 2019, with English translation.
PCT, Written Opinion of the International Searching Authority for the corresponding patent application No. PCT/JP2019/026107, dated Oct. 1, 2019 (English translation not available).
Office Action for the corresponding Japanese application No. 2020-541031, dated Dec. 27, 2022, with English translation.
Office Action for the corresponding Taiwanese application No. 108123252, dated Dec. 15, 2022, with English translation.
Office Action for the corresponding Chinese application No. 201980054627.6, dated Feb. 2, 2023, with English translation.

(Continued)

*Primary Examiner* — Sanza L. McClendon
(74) *Attorney, Agent, or Firm* — LUCAS & MERCANTI, LLP

(57) ABSTRACT

An object of the present invention is to provide a curable resin composition in which the refractive index of a cured material is low and the adhesive strength to a member is excellent.

There is provided a curable resin composition including:
(A) component: an oligomer containing a (meth)acryloyl group and a fluorine atom in a molecule;
(B) component: polyfunctional (meth)acrylate not containing a fluorine atom in a molecule;
(C) component: a compound, not containing a fluorine atom in a molecule, of at least one selected from the group consisting of monofunctional (meth)acrylate containing a hydroxyl group, monofunctional (meth)acrylate containing an alicyclic ring, monofunctional (meth)acrylate containing an aromatic ring, (meth)acrylamide, and (meth)acrylic acid; and
(D) component: a radical initiator,
wherein a content of the (B) component is 0.1 parts by mass or more and 7.8 parts by mass or less relative to 100 parts by mass of the (A) component.

19 Claims, No Drawings

(56) References Cited

FOREIGN PATENT DOCUMENTS

WO    WO-2010016452 A1 *   2/2010   ............ C08F 299/00

OTHER PUBLICATIONS

Office Action dated Jun. 2, 2023, for the corresponding Taiwanese patent application No. 108123252, with Englsih translation.
Office Action dated Jul. 15, 2023, for the corresponding Chinese patent application No. 201980054627.6, with English translation.

* cited by examiner

CURABLE RESIN COMPOSITION AND CURED MATERIAL

CROSS REFERENCE TO RELATED APPLICATION

This Application is a 371 of PCT/JP2019/026107 filed on Jul. 1, 2019 which, in turn, claimed the priority of Japanese Patent Application No. 2018-165221 filed on Sep. 4, 2018, both applications are incorporated herein by reference.

TECHNICAL FIELD

The present invention relates to a curable resin composition and a cured material.

BACKGROUND ART

Conventionally, a photocurable resin composition which exhibits excellent transparency in a short time when irradiated with light has been often used in the process of producing electric and electronic components. For example, in recent years, an image display device such as a liquid crystal display or an organic EL display has been installed in an electronic mobile device such as a mobile phone or a multifunctional mobile phone, a game machine, a personal computer, and the like. In the image display device, a space is provided between a display module and a cover panel. The problem of the image display device is that when only air exists in the space, scattering of light generates, resulting in a reduction in illumination and contrast. Accordingly, it has been studied to fill the space between the cover panel and the display module with a photocurable resin composition having excellent transparency. For example, an adhesive composition containing polyurethane acrylate, isobornyl acrylate, and a photopolymerization initiator is disclosed in Examples of JP 2016-103030 (corresponding to US 2010-097746 A).

SUMMARY OF INVENTION

Technical Problem

However, the refractive index of the cured material of the adhesive disclosed in JP 2016-103030 A is high, and therefore the adhesive has been insufficient as an adhesive for optical components used for optical devices such as various lenses, light emitting elements, and light receiving elements.

Solution to Problem

In light of the above-described problem, an object of the present invention is to provide a curable resin composition in which the refractive index of a cured material is low and the adhesive strength to a member is excellent.

The gist of the present invention is described below.

[1]
A curable resin composition including:
(A) component: an oligomer containing a (meth)acryloyl group and a fluorine atom in a molecule;
(B) component: polyfunctional (meth)acrylate not containing a fluorine atom in a molecule;
(C) component: a compound, not containing a fluorine atom in a molecule, of at least one selected from the group consisting of monofunctional (meth)acrylate containing a hydroxyl group, monofunctional (meth)acrylate containing an alicyclic ring, monofunctional (meth)acrylate containing an aromatic ring, (meth)acrylamide, and (meth)acrylic acid; and
(D) component: a radical initiator,
wherein a content of the (B) component is 0.1 parts by mass or more and 7.8 parts by mass or less relative to 100 parts by mass of the (A) component.

[2]
The curable resin composition according to [1], wherein the (A) component is a urethane(meth)acrylate oligomer containing a fluorine atom in a molecule.

[3]
The curable resin composition according to [1] or [2], wherein the (A) component is a urethane (meth)acrylate oligomer containing a perfluoropolyether skeleton.

[4]
The curable resin composition according to any one of [1] to [3], wherein the (B) component is (meth)acrylate having 2 to 6 (meth)acryloyl groups.

[5]
The curable resin composition according to any one of [1] to [4], wherein the (B) component is at least one selected from the group consisting of neopentylglycol di(meth)acrylate, dicyclopentenyl di(meth)acrylate, alkylene oxide-modified bisphenol di(meth)acrylate, di(meth)acryloyl isocyanurate, isocyanuric acid ethylene oxide-modified di(meth)acrylate, isocyanuric acid propylene oxide-modified di(meth)acrylate, epoxy di(meth)acrylate, trimethylolpropane tri(meth)acrylate, trimethylolpropane propylene oxide-modified tri(meth)acrylate, pentaerythritol tri(meth) acrylate, isocyanuric acid ethylene oxide-modified tri(meth) acrylate, isocyanuric acid propylene oxide-modified tri (meth)acrylate, caprolactone-modified tris((meth)acryloxy ethyl)isocyanurate, glycerin tri(meth)acrylate, ditrimethylolpropane tetra(meth)acrylate, pentaerythritol tetra(meth) acrylate, dipentaerythritol monohydroxy penta(meth)acrylate, alkyl-modified dipentaerythritol pentaacrylate, and dipentaerythritol hexa(meth)acrylate.

[6]
The curable resin composition according to any one of [1] to [5], wherein the curable resin composition contains the (C) component in an amount of 2 parts by mass or more and 100 parts by mass or less relative to 1 part by mass of the (B) component.

[7]
The curable resin composition according to any one of [1] to [6], wherein the (D) component is a photo-radical initiator.

[8]
The curable resin composition according to any one of [1] to [7], wherein a refractive index of a cured material is 1.40 or less.

[9]
The curable resin composition according to any one of [1] to [8], wherein the curable resin composition is an optical coating agent, a sealant, or an adhesive.

[10]
A cured material formed by curing the curable resin composition according to any one of [1] to [9].

DESCRIPTION OF EMBODIMENTS

The details of the invention are described below.
The curable resin composition of the present invention includes: (A) component: an oligomer containing a (meth) acryloyl group and a fluorine atom in a molecule;
(B) component: polyfunctional (meth)acrylate not containing a fluorine atom in a molecule;

(C) component: a compound, not containing a fluorine atom in a molecule, of at least one selected from the group consisting of monofunctional (meth)acrylate containing a hydroxyl group, monofunctional (meth)acrylate containing an alicyclic ring, monofunctional (meth)acrylate containing an aromatic ring, (meth)acrylamide, and (meth)acrylic acid; and (D) component: a radical initiator, wherein a content of the (B) component is 0.1 parts by mass or more and 7.8 parts by mass or less relative to 100 parts by mass of the (A) component.

The present invention provides a curable resin composition in which the refractive index of a cured material is low and the adhesive strength to a member is excellent.

<(A) Component>

The (A) component of the present invention is not particularly limited as long as it is an oligomer containing a (meth)acryloyl group and a fluorine atom in a molecule. Among oligomers, the (A) component of the present invention is used, whereby a remarkable effect is obtained such that the refractive index of a cured material is specifically low, and the adhesive strength to a member is specifically excellent. Since the above effect is given more remarkably, the (A) component is preferably a urethane(meth)acrylate oligomer containing a fluorine atom in a molecule. Since the above effect is given particularly remarkably, the (A) component is particularly preferably is a urethane(meth)acrylate oligomer containing a perfluoropolyether skeleton.

The position in the molecule of the (meth)acryloyl group of the (A) component is not particularly limited. From the viewpoint that the adhesive strength is excellent, the (meth)acryloyl group is preferably positioned at a terminal or side chain in the molecule, and is particularly preferably positioned at the terminal. The methacryloyl group refers to an acryloyl group and a methacryloyl group. In the (A) component of the present invention, and the (meth)acryloyl group is preferably a methacryloyl group from the viewpoint that a cured material with higher curability and lower refractive index is obtained.

The weight-average molecular weight of the (A) component is preferably 300 or more and less than 10,000, more preferably 500 or more and less than 7500, and particularly preferably 700 or more and less than 5000. When the weight-average molecular weight is within the above range, the adhesive strength is much more excellent. The weight-average molecular weights may be used singly, or in combination of two or more kinds thereof. In the present specification, the "weight-average molecular weight" is a weight-average molecular weight (Mw) converted by polystyrene, measured by gel permeation chromatography (GPC).

Commercially available products of the (A) component is not particularly not limited, and examples thereof include FOMBLIN (registered trademark) MD40, FLUOROLINK (registered trademark) AD1700, FLUOROLINK (registered trademark) MD700, manufactured by Solvay Specialty Polymers Japan K.K., and the like.

<(B) Component>

The (B) component of the present invention is not particularly limited as long as it is a polyfunctional (meth)acrylate not containing a fluorine atom in a molecule. Preferable examples of the (B) component include (meth)acrylates having 2 to 6 (meth)acryloyl groups from the viewpoint that the refractive index of a cured material is low and the adhesive strength to a member is excellent. The (meth)acrylates can be used may be used singly, or as a mixture of two or more kinds thereof.

Examples of the (meth)acrylates having 2 (meth)acryloyl groups include neopentylglycol di(meth)acrylate, dicyclopentenyl diacrylate, alkylene oxide-modified bisphenol di(meth)acrylate, di(meth)acryloyl isocyanurate, isocyanuric acid ethylene oxide-modified di(meth)acrylate, isocyanuric acid propylene oxide-modified di(meth)acrylate, epoxy di(meth)acrylate, and the like. Among them, dicyclopentenyl diacrylate, di(meth)acryloyl isocyanurate, isocyanuric acid ethylene oxide-modified di(meth)acrylate, and isocyanuric acid propylene oxide-modified di(meth)acrylate are preferable. Particularly preferable are di(meth)acryloyl isocyanurate, isocyanuric acid ethylene oxide-modified di(meth)acrylate, and isocyanuric acid propylene oxide-modified di(meth)acrylate. Among the (B) components of the present invention, the compounds described above are selected, whereby a much more remarkable effect is obtained such that the refractive index of a cured material is specifically low, and the adhesive strength to a member is specifically excellent.

Examples of the (meth)acrylates having 3 to 6 (meth)acryloyl groups include trimethylolpropane tri(meth)acrylate, trimethylolpropane propylene oxide-modified tri(meth)acrylate, pentaerythritol tri(meth)acrylate, isocyanuric acid ethylene oxide-modified tri(meth)acrylate, isocyanuric acid propylene oxide-modified tri(meth)acrylate, caprolactone-modified tris((meth)acryloxy ethyl)isocyanurate, glycerin tri(meth)acrylate, ditrimethylolpropane tetra(meth)acrylate, pentaerythritol tetra(meth)acrylate, dipentaerythritol monohydroxy penta(meth)acrylate, alkyl-modified dipentaerythritol pentaacrylate, dipentaerythritol hexa(meth)acrylate, and the like. Among them, trimethylolpropane tri(meth)acrylate, trimethylolpropane propylene oxide-modified tri(meth)acrylate, pentaerythritol tri(meth)acrylate, isocyanuric acid ethylene oxide-modified tri(meth)acrylate, isocyanuric acid propylene oxide-modified tri(meth)acrylate, ditrimethylolpropane tetra(meth)acrylate, pentaerythritol tetra(meth)acrylate, and dipentaerythritol hexa(meth)acrylate are preferable. Particularly preferable are trimethylolpropane tri(meth)acrylate, trimethylolpropane propylene oxide-modified tri(meth)acrylate, isocyanuric acid ethylene oxide-modified tri(meth)acrylate, isocyanuric acid propylene oxide-modified tri(meth)acrylate, and dipentaerythritol hexa(meth)acrylate. Among the (B) components of the present invention, the compounds described above are selected, whereby a much more remarkable effect is obtained such that the refractive index of a cured material is specifically low, and the adhesive strength to a member is specifically excellent. These compounds may be used singly, or as a mixture of two or more kinds thereof.

Commercially available products of the (B) component are not particularly limited, and examples thereof include ARONIX (registered trademark) M-313 and 315, manufactured by TOAGOSEI CO., LTD., KAYARAD (registered trademark) DPHA, manufactured by Nippon Kayaku Co., Ltd., FA-731A, manufactured by Hitachi Chemical Co., Ltd., and the like.

The content of the (B) component relative to 100 parts by mass of the (A) component is 0.1 parts by mass or more and 7.8 parts by mass or less, preferably 0.1 parts by mass or more and 7.5 parts by mass or less, more preferably 0.2 parts by mass or more and 5.0 parts by mass or less, and particularly preferably 0.3 parts by mass or more and 3.0 parts by mass or less. When the content is within the above range, it is possible to obtain a curable resin composition in which the refractive index of a cured material is low and the adhesive strength to a member is excellent.

<(C) Component>

The (C) component of the present invention is not particularly limited as long as it is a compound, not containing a fluorine atom in a molecule, of at least one selected from the group consisting of monofunctional (meth)acrylate containing a hydroxyl group, monofunctional (meth)acrylate containing an alicyclic ring, monofunctional (meth)acrylate containing an aromatic ring, (meth)acrylamide, and (meth) acrylic acid. From the viewpoint that the refractive index of the cured material is much lower, and the adhesive strength to the member is excellent, a particularly preferable compound is a compound, not containing a fluorine atom in a molecule, of at least one selected from the group consisting of monofunctional (meth)acrylate containing a hydroxyl group, monofunctional (meth)acrylate containing an alicyclic ring, (meth)acrylamide, and (meth)acrylic acid. Among monofunctional monomers, the (C) component of the present invention is selected and combined with the (A) component and the (B) component of the present invention, whereby a remarkable effect is obtained such that the refractive index of a cured material is low, and the adhesive strength to a member is excellent. In the present specification, the monofunctional (meth)acrylate refers to a monomer having a (meth)acryloyl group.

The monofunctional (meth)acrylate containing a hydroxyl group is not particularly limited, and examples thereof include 2-hydroxyethyl(meth)acrylate, 2-hydroxypropyl (meth)acrylate, 4-hydroxybutyl(meth)acrylate, 2-hydroxybutyl(meth)acrylate, 2-hydroxy-3-methoxy propyl(meth) acrylate, (meth)acryloyloxyethyl acid phosphate, (meth) acryloyloxyethyl-succinic acid, and the like. Among them, 2-hydroxyethyl(meth)acrylate, 2-hydroxypropyl(meth)acrylate, 4-hydroxybutyl(meth)acrylate, and the like are preferable from the viewpoint that the refractive index of the cured material is much lower, and the adhesive strength to the member is excellent. These compounds may be used singly, or as a mixture of two or more kinds thereof. The (meth) acryloyl group refers to an acryloyl group and a methacryloyl group, and the monofunctional (meth)acrylate containing a hydroxyl group is preferably a methacryloyl group from the viewpoint that a cured material with higher curability and lower refractive index is obtained. Further, commercially available products of the monofunctional (meth)acrylate containing a hydroxyl group are not particularly limited, and examples thereof include LIGHT ESTER (registered trademark) HOB, HO-250 (N), manufactured by KYOEISHA CHEMICAL Co., Ltd., HPMA, manufactured by Nippon Kayaku Co., Ltd., and the like. In present specification, monofunctional (meth)acrylate containing both a hydroxyl group and an aromatic ring is regarded as monofunctional (meth)acrylate containing a hydroxyl group.

The monofunctional (meth)acrylate containing an alicyclic ring is not particularly limited, and examples thereof include cyclohexyl(meth)acrylate, trimethylcyclohexyl (meth)acrylate, t-butylcyclohexyl(meth)acrylate, dicyclopentanyl(meth)acrylate, dicyclopentenyl(meth)acrylate, isobornyl(meth)acrylate, adamantyl(meth)acrylate, and the like. Among them, cyclohexyl(meth)acrylate, trimethylcyclohexyl(meth)acrylate, t-butylcyclohexyl(meth)acrylate, dicyclopentanyl(meth)acrylate, dicyclopentenyl(meth)acrylate, isobornyl(meth)acrylate, and the like are preferable from the viewpoint that the refractive index of the cured material is much lower, and the adhesive strength to the member is much excellent. These compounds may be used singly, or as a mixture of two or more kinds thereof. The (meth)acryloyl group refers to an acryloyl group and a methacryloyl group, and the monofunctional (meth)acrylate containing an alicyclic ring is preferably an acryloyl group from the viewpoint that a cured material with higher curability and lower refractive index is obtained. Further, commercially available products of the monofunctional (meth)acrylate containing an alicyclic ring are not particularly limited, and examples thereof include IBX-A and IBX, manufactured by KYOEISHA CHEMICAL Co., Ltd., FA-513M, FA-513AS, FA511AS, and FA-512AS, manufactured by Hitachi Chemical Co., Ltd., BISCOAT #155 and MADA, manufactured by OSAKA ORGANIC CHEMICAL INDUSTRY LTD., CHA, manufactured by TOAGOSEI CO., LTD., SR-217, manufactured by Sartomer Co. Ltd., TBCHMA manufactured by MCC UNITEC Co., Ltd., and the like. In the present specification, the monofunctional (meth)acrylate containing both a hydroxyl group and an alicyclic ring is regarded as monofunctional (meth)acrylate containing a hydroxyl group.

The monofunctional (meth)acrylate containing an aromatic ring is not particularly limited, and examples thereof include phenoxyethyl(meth)acrylate, phenoxymonoethyleneglycol(meth)acrylate, phenoxydiethyleneglycol(meth)acrylate, phenoxytriethyleneglycol(meth)acrylate, phenoxytetraethyleneglycol(meth)acrylate, nonylphenoxymonoethyleneglycol(meth)acrylate, nonylphenoxydiethyleneglycol(meth)acrylate, nonylphenoxytriethyleneglycol(meth)acrylate, nonylphenoxytetraethyleneglycol(meth)acrylate, and the like. Among them, phenoxyethyl(meth)acrylate, phenoxymonoethylene glycol (meth)acrylate, phenoxydiethyleneglycol(meth)acrylate nonylphenoxymonoethyleneglycol(meth)acrylate, nonylphenoxydiethyleneglycol(meth)acrylate are preferable from the viewpoint that the refractive index of the cured material is much lower, and the adhesive strength to the member is excellent. These compounds may be used singly, or as a mixture of two or more kinds thereof. Commercially available products of the monofunctional (meth)acrylate containing an aromatic ring are not particularly limited, and examples thereof include PO-A, P2H-A, and P-200A, all manufactured by KYOEISHA CHEMICAL Co., Ltd., and the like.

The (meth)acrylamide is not particularly limited, and examples thereof include dimethyl(meth)acrylamide, diethyl(meth)acrylamide, acryloyl morpholine, hydroxyethyl (meth)acrylamide, isopropyl(meth)acrylamide, dimethylaminopropylacrylamide, and the like. Among them, dimethyl(meth)acrylamide, diethyl(meth)acrylamide, and acryloyl morpholine are preferable from the viewpoint that the refractive index of the cured material is much lower, and the adhesive strength to the member is much excellent. These compounds may be used singly, or as a mixture of two or more kinds thereof. The (meth)acryloyl group refers to an acryloyl group and a methacryloyl group, and the (meth) acrylamide is preferably an acryloyl group from the viewpoint that a cured material with higher curability and lower refractive index is obtained. Commercially available products of the (meth)acrylamide are not particularly limited, and examples thereof include DMAA (registered trademark), HEAA (registered trademark), DEAA (registered trademark), and ACMO (registered trademark), all manufactured by KJ Chemicals Corporation, and the like.

Commercially available products of the (meth)acrylic acid are not particularly limited, and examples thereof include GA, manufactured by Mitsubishi Chemical Corporation, and the like.

The content of the (C) component relative to 1 part by mass of the (B) component is not particularly limited. For example, the content of the (C) component is preferably 2 parts by mass or more and 100 parts by mass or less, more preferably 4 parts by mass or more and 50 parts by mass or less, and particularly preferably 5 parts by mass or more and 30 parts by mass or less, relative to 1 part by mass of the (B) component. When the content is within the above range, it is possible to obtain a curable resin composition in which the refractive index of a cured material is much lower and the adhesive strength to a member is much excellent.

The content of the (C) component relative to 100 parts by mass of the (A) component is not particularly limited. For example, the content of the (C) component is preferably 1 part by mass or more and 200 parts by mass or less, more preferably 2 parts by mass or more and 100 parts by mass or less, and particularly preferably 3 parts by mass or more and 50 parts by mass or less, relative to 100 parts by mass of the (A) component. When the content is within the above range, it is possible to obtain a curable resin composition in which the refractive index of a cured material is much lower and the adhesive strength to a member is much excellent.

<(D) Component>

The (D) component which can be used in the present invention is a radical initiator. Examples of the (D) component include a photo-radical initiator, an organic peroxide, and the like. Regarding the cured form of the curable resin composition of the present invention, it is possible to select a photo-cured form, a heat-cured form or redox-cured form depending on the selection of the (D) component of the present invention. For example, in the case of giving "photocurability" to the curable resin composition, the photo-radical initiator is selected. In the case of giving "curing by heat or curing by a redox reaction", the organic peroxide may be selected. From the viewpoint that short-time curing can be achieved, it is preferable that the (D) component is a photo-radical initiator.

The content of the (D) component is not particularly limited, and the (D) component is preferably 0.01 parts by mass or more and 10 parts by mass or less relative to 100 parts by mass of the (A) component. When the content of the (D) component is 0.01 parts by mass or more, the curability is excellent. When the content is 10 parts by mass or less, it is possible to make the storage stability of the curable resin composition good.

The photo-radical initiator as the (D) component used in the present invention is not particularly limited as long as it is a compound which generates radicals when irradiated with active energy rays. Examples of the photo-radical initiator as the (D) component include an acetophenone-based photo-radical initiator, a benzoin-based photo-radical initiator, a benzophenone-based photo-radical initiator, a thioxanthone-based photo-radical initiator, an acylphosphine oxide-based photo-radical initiator, a titanocene-based photo-radical initiator, and the like. Among the photo-radical initiators, the acetophenone-based photo-radical initiator and the acylphosphine oxide-based photo-radical initiator are preferable from the viewpoint that the photocurability is excellent. Further, these photo-radical initiators may be used singly, or in combination of two or more kinds thereof.

Examples of the acetophenone-based photo-radical initiator include, but are not limited to, diethoxyacetophenone, 2-hydroxy-2-methyl-1-phenylpropane-1-one, benzyl dimethyl ketal, 4-(2-hydroxyethoxy)phenyl-(2-hydroxy-2-propyl)ketone, 1-hydroxy-cyclohexyl-phenyl-ketone, 2-methyl-2-morpholino (4-thiomethylphenyl)propane-1-one, 2-benzyl-2-dimethylamino-1-(4-morpholinophenyl) butanone, 2-hydroxy-2-methyl-1-[4-(1-methylvinyl)phenyl] propanone oligomer, and the like. Examples of commercially available products of include IRGACURE (registered trademark) 184, DAROCUR (registered trademark) 1173, manufactured by BASF SE, and the like.

Examples of the acylphosphine oxide-based photo-radical initiator include, but are not particularly limited to, bis(2,4,6-trimethylbenzoyl)-phenylphosphine oxide, 2,4,6-trimethylbenzoyl-diphenylphosphine oxide, and the like.

The organic peroxide as the (D) component used in the present invention is a compound which generates radicals by heating at 50° C. or more, or a redox reaction. When a redox reaction is used, radicals can be generated at room temperature, so this is preferable. The organic peroxide as the (D) component is not particularly limited, and examples thereof include ketone peroxide compounds such as methyl ethyl ketone peroxide, cyclohexanon peroxide, 3,3,5-trimethylcyclohexanone peroxide, methylcyclohexanone peroxide, methylacetoacetate peroxide, acetylacetone peroxide; peroxyketal compounds, such as 1,1-bis(t-butylperoxy)-3,3,5-trimethylcyclohexane, 1,1-bis(t-butylperoxy)cyclohexane, 2,2-bis(t-butylperoxy)octane, n-butyl-4,4-bis(t-butylperoxy) valerate, and 2,2-bis(t-butylperoxy)butane;

hydroperoxide compounds such as t-butyl hydroperoxide, cumene hydroperoxide, diisopropylbenzene hydroperoxide, p-menthane hydroperoxide, 2,5-dimethylhexane-2,5-dihydroperoxide, and 1,1,3,3-tetramethylbutyl hydroperoxide;

dialkyl peroxide compounds such as di-t-butyl peroxide, t-butyl cumyl peroxide, dicumyl peroxide, α,α'-bis(t-butylperoxy-m-isopropyl)benzene, 2,5-dimethyl-2,5-di(t-butylperoxy)hexane, and 2,5-dimethyl-2,5-di(t-butylperoxy) hexyne-3; diacyl peroxide compounds such as acetyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide, and m-toluoyl peroxide; peroxy dicarbonate compounds such as diisopropylperoxydicarbonate, di-2-ethylhexylperoxydicarbonate, di-n-propylperoxydicarbonate, bis-(4-t-butylcyclohexyl)peroxydicarbonate, dimyristyl peroxydicarbonate, di-2-ethoxyethyl peroxydicarbonate, dimethoxyisopropyl peroxydicarbonate, di(3-methyl-3-methoxybutyl)peroxydicarbonate, and diallyl peroxydicarbonate;

peroxy ester compounds such as t-butylperoxyacetate, t-butylperoxyisobutyrate, t-butylperoxypivalate, t-butylperoxyneodecanoate, cumyl peroxyneodecanoate, t-butyl-2-ethylperoxyhexanoate, t-butylperoxy-3,5,5-trimethylhexanoate, t-butylperoxylaurate, t-butylperoxybenzoate, di-t-butylperoxyisophthalate, 2,5-dimethyl-2,5-di(benzoylperoxy) hexane, t-butylperoxy maleic acid, t-butylperoxyisopropylcarbonate, cumyl peroxyoctoate, t-hexylperoxyneodecanoate, t-hexylperoxypivalate, t-butylperoxyneohexanoate, t-hexylperoxyneohexanoate, and cumyl peroxyneohexanoate;

and acetylcyclohexylsulfonylperoxide and t-butylperoxyallylcarbonate; and the like. These organic peroxides may be used singly, or in combination of a plurality of kinds thereof. Among them, dialkyl peroxide compounds, peroxy dicarbonate compounds, peroxy ester compounds are preferably used from the viewpoint of the curability. Further, examples of organic peroxides suitable for a redox reaction include dialkyl peroxide compounds.

When an organic peroxide is used as the (D) component, a curing accelerator can be blended in order to promote a redox reaction. Such a curing accelerator is not particularly limited. Preferably, saccharin (o-benzoic sulfimide), a hydrazine-based compound, an amine compound, a mercaptan compound, an organic metal compound, and the like are used. The curing accelerators may be used singly, or in combination of a plurality of kinds thereof. Since combination use results in good curing accelerating effect, and thus this is preferable.

Examples of the hydrazine-based compound include 1-acetyl-2-phenylhydrazine, 1-acetyl-2(p-tolyl)hydrazine, 1-benzoyl-2-phenyl hydrazine, 1-(1',1',1'-trifluoro)acetyl-2-phenyl hydrazine, 1,5-diphenyl-carbohydrazine, 1-formyl-2-phenyl hydrazine, 1-acetyl-2-(p-bromophenyl)hydrazine, 1-acetyl-2-(p-nitrophenyl)hydrazine, 1-acetyl-2-(2'-phenyl-ethylhydrazine), ethyl carbazate, p-nitrophenyl hydrazine, p-trisulfonyl hydrazide, and the like.

Examples of the amine compound include heterocyclic secondary amines such as 2-ethylhexylamine, 1,2,3,4-tetrahydroquinone, and 1,2,3,4-tetrahydroquinaldine; heterocyclic tertiary amines such as quinoline, methylquinoline, quinaldine, and quinoxaline phenazine; aromatic tertiary amines such as N,N-dimethyl-para-toluidine, N,N-dimethyl-anisidine, and N,N-dimethylaniline; azole-based compounds such as 1,2,4-triazole, oxazole, oxadiazole, thiadiazole, benzotriazole, hydroxybenzotriazole, benzoxazol, 1,2,3-benzothiadiazole, and 3-mercaptobenzotrizole; and the like.

Examples of the mercaptan compound include n-dodecyl mercaptan, ethyl mercaptan, butyl mercaptan, tris-[(3-mercaptopropionyloxy)-ethyl]-isocyanurate, pentaerythritoltetrakis(3-mercaptopropionate), dipentaerythritolhexakis(3-mercaptopropionate), trimethylolpropanetris(3-mercaptopropionate), trimethylolpropanetris(thioglycolate), pentaerythritoltetrakis(thioglycolate), and the like.

Examples of the organic metal compound include pentadione iron, pentadione cobalt, cobalt neodecanoate, pentadione copper, propylenediamine copper, ethylenediamine copper, copper neodecanoate, iron naphthenate, nickel naphthenate, cobalt naphthenate, copper naphthenate, copper octenoate, iron hexoate, iron propionate, acetylacetone vanadium, and the like.

The curable resin composition of the present invention can be used as a one-pack composition, and can also be used as a two-pack composition. In the case of the two-pack composition, it is preferable that the photo-radical initiator of the (D) component is included in one of the liquids, and the organic metal compound of the (D) component is included in the other liquid. Thus, the photo-radical initiator and the organic metal compound of the (D) component are divided into separate liquids, so that a useless reaction can be suppressed during storage and the storage stability can be improved. The two liquids can be mixed when used, or applied separately, and then brought into contact and cured. Here, components other than the photo-radical initiator of the (D) component and the organic metal compound can be divided at an arbitrary ratio, and can be included in each of the liquids.

<Optional Component>

Additives such as an adhesive aid (such as a silane coupling agent), a filler, an adherence-imparting agent (such as a tackifier), a thermoplastic elastomer, rubbery polymer particles, a preservation stabilizer (such as BHT), an anti-oxidant, a light stabilizer, a plasticizer, a dye, a pigment, a flame retarder, a sensitizer, an organic solvent, a heavy metal deactivator, an ion-trapping agent, an emulsifier, a water-dispersible stabilizer, an anti forming agent, a mold releasing agent, a leveling agent, a wax, a rheology control agent or a surface active agent may be blend with the present invention within a range that does not impair the scope of the present invention. It is preferable that dimethyl silicone is not contained in the curable resin composition of the present invention from the viewpoint of balance of compatibility among the (A) to (C) components.

Examples of the silane coupling agent include glycidyl group-containing silane coupling agents such as 3-glycidoxylpropylmethyldimethoxysilane 3-glycidoxypropylmethyldiethoxysilane, 3-glycidoxypropylmethyldipropyloxysilane, 3-glycidoxypropyldimethylmonomethoxysilane, 3-glycidoxypropyldimethylmonoethoxysilane, 3-glycidoxypropyldimethylmonopropyloxysilane, 2-(3,4-epoxycyclohexyl) ethyltrimethoxysilane, 3-glycidoxypropyltriethoxysilane, 3-glycidoxypropyltrimethoxysilane, and 3-glycidoxypropylmethyldiethoxysilane;

vinyl group-containing silane coupling agents such as vinyltris(β-methoxyethoxy)silane, vinyltriethoxysilane, and vinyltrimethoxysilane;

(meth)acryl group-containing silane coupling agents such as 3-methacryloxypropylmethyldimethoxysilane, 3-methacryloxypropylmethyldiethoxysilane, 3-methacryloxypropyldimethylmonomethoxysilane, 3-methacryloxypropyldimethylmonoethoxysilane, 3-acryloxypropylmethyldipropyloxysilane, 3-acryloxypropylmethyldimethoxysilane, 3-acryloxypropylmethyldiethoxysilane, 3-acryloxypropylmethyldipropyloxysilane, 3-acryloxypropyldimethylmonopropyloxysilane, 3-acryloxypropyldimethylmonomethoxysilane, 3-acryloxypropyldimethylmonoethoxysilane, 3-acryloxypropyldimethylmonopropyloxysilane, and γ-methacryloxypropyltrimethoxysilane;

amino group-containing silane coupling agents such as N-β-(aminoethyl)-γ-aminopropyltrimethoxysilane, γ-aminopropyltriethoxysilane, and N-phenyl-γ-aminopropyltrimethoxysilane; other silane coupling agents such as γ-mercaptopropyltrimethoxysilane and γ-chloropropyltrimethoxysilane; and the like. Among these silane coupling agents, a glycidyl group-containing silane coupling agent, a vinyl group-containing silane coupling agent, and a (meth)acryl group-containing silane coupling agent are preferable from the viewpoint that the adhesive strength is excellent. These silane coupling agents may be used singly, or in combination of two or more kinds thereof. Further, the content of the silane coupling agent is preferably 0.1 parts by mass or more and 20 parts by mass or less relative to 100 parts by mass of the (A) component of the present invention, from the viewpoint that the refractive index of a cured material is much lower and the adhesive strength to a member is much excellent.

Examples of the filler include glass, silica, alumina, talc, mica, calcium carbonate, aluminum nitride, carbon powder, kaolin clay, dried clay mineral, dried diatomite, and the like.

From the viewpoint that the refractive index of a cured material is much lower and the adhesive strength to a member is much excellent, the average particle diameter of a filler is preferably 0.001 μm or more and 100 μm or less, more preferably 0.01 μm or more and 50 μm or less, and particularly preferably 0.1 μm or more and 20 μm or less. In this regard, a method of measuring the average particle diameter is a laser diffraction method. The content of the filler is not particularly limited, and is preferably 0.1 parts by mass or more and 300 parts by mass or less, more preferably 1 part by mass or more and 200 parts by mass or less, and particularly preferably 5 parts by mass or more and 100 parts by mass or less, relative to 100 parts by mass of the (A) component, from the viewpoint that the refractive index of a cured material is much lower and the adhesive strength to a member is much excellent.

A silica-based filler is blended in order to increase the mechanical strength of the cured material. Preferably, a silica-based filler or the like obtained by hydrophobic treatment with a dimethyldichlorosilane, a hexamethylsilazane, an aminosilane, an alkylsilane having 1 to 12 carbon atoms, a silane having a (meth)acryloyl group, or the like is used. Examples of commercially available products of silica include AEROSIL (registered trademark) R974, R972, R9200, R976, R976S, RX50, NAX50, NX90, RX200, R8200, RX300, R812, R812S, RY50, NY50, RY200S, R202, RY200, RY300, R104, R106, RA200H, RA200HS, R805, R816, RM50, R711, and R7200 (manufactured by Nippon Aerosil Co. Ltd.).

Among the above optional components, an antioxidant and a light stabilizer are preferably added in order to improve the weather resistance of the curable resin composition. Commercially available products of the antioxidant and the light stabilizer can be used. Examples thereof include SUMILIZER BHT, SUMILIZER S, SUMILIZER BP-76, SUMILIZER MDP-S, SUMILIZER GM, SUMILIZER BBM-S, SUMILIZER WX-R, SUMILIZER NW, SUMILIZER BP-179, SUMILIZER BP-101, SUMILIZER GA-80, SUMILIZER TNP, SUMILIZER TPP-R, and SUMILIZER P-16 (manufactured by Sumitomo Chemical Co., Ltd. "SUMILIZER" is a registered trademark of Sumitomo Chemical Co., Ltd.); ADK STAB AO-20, ADK STAB AO-30, and ADK STAB AO-40, ADK STAB AO-50, ADK STAB AO-60, ADK STAB AO-70, ADK STAB AO-80, ADK STAB AO-330, ADK STAB PEP-4C, ADK STAB PEP-8, ADK STAB PEP-24G, ADK STAB PEP-36, ADK STAB HP-10, ADK STAB 2112, ADK STAB 260, ADK STAB 522A, ADK STAB 329K, ADK STAB 1500, ADK STAB C, ADK STAB 135A, and ADK STAB 3010 (manufactured by ADEKA CORPORATION, "ADK STAB" is a registered trademark of ADEKA CORPORATION); and TINUVIN 770, TINUVIN 765, TINUVIN 144, TINUVIN 622, TINUVIN 111, TINUVIN 123, and TINUVIN 292 (manufactured by Ciba Specialty Chemicals, "TINUVIN" is a registered trademark of Ciba Specialty Chemicals); and the like. The contents of the antioxidants and light stabilizers are not limited, and are preferably 0.001 parts by mass or more and 10 parts by mass or less, and more preferably 0.01 parts by mass or more and 5 parts by mass or less, relative to 100 parts by mass of the (A) component.

<Production Method>

The curable resin composition of the present invention can be produced by a conventionally known method. For example, predetermined amounts of the (A) component to (D) component are blended and mixed preferably at 10° C. or more and 70° C. or less, and preferably for 0.1 hour or more and 5 hours or less using a mixing unit such as a mixer. Further, the production is preferably carried out under light-shielding conditions.

<Coating Method>

As a method of coating an adherend with the curable resin composition of the present invention, for example, a method such as dispensing using an automatic coater, spraying, inkjet, screen printing, gravure printing, dipping, or spin coating can be used. The curable resin composition of the present invention is preferably in liquid form at 25° C. from the viewpoint of coatability.

<Curing Method and Cured Material>

Regarding the cured form of the curable resin composition of the present invention, it is possible to select a photo-cured form, a heat-cured form or redox-cured form depending on the selection of the (D) component of the present invention. For example, in the case of giving "photocurability" to the curable resin composition, the photo-radical initiator is selected. In the case of giving "curing by heat or curing by a redox reaction", the organic peroxide may be selected. Further, photocurability and curing by heat or curing by a redox reaction (also simply referred to as "heat curability") may be given to the curable resin composition. In this case, a photo-radical initiator and an organic peroxide may be used in combination as the component (D), and curing conditions where photocurability is given and curing conditions where heat curability is given may be added, as described below.

Regarding the curing conditions where photocurability is given to the curable resin composition of the present invention, a light source for curing the curable resin composition of the present invention by irradiation with light of ultraviolet rays, visible rays, and the like is not particularly limited. Examples thereof include a low pressure mercury lamp, a medium pressure mercury lamp, a high pressure mercury lamp, an extra high pressure mercury lamp, a black light lamp, a microwave excited mercury lamp, a metal halide lamp, a sodium lamp, a halogen lamp, a xenon lamp, an LED, a fluorescent lamp, sunlight, an electron beam irradiation device, and the like. An irradiation dose of light irradiation is preferably 10 kJ/m$^2$ or more and more preferably 15 kJ/m$^2$ or more from the viewpoint of the characteristics of a cured material. Further, the curing conditions where heat curability is given to the curable resin composition of the present invention is not particularly limited, and for example, the temperature is preferably 45° C. or more and less than 200° C., and more preferably 50° C. or more and less than 150° C. The curing time is not particularly limited, and is preferably 3 minutes or more and less than 5 hours, and more preferably 10 minutes or more and within 3 hours when the temperature is 45° C. or more and less than 200° C. Also, a cured material obtained by curing the curable resin composition of the present invention is a part of the embodiment of the present invention. When the curable resin composition of the present invention is used as an optical adhesive described later, the refractive index of the cured material is preferably 1.40 or less. The bonded body obtained by bonding with the curable resin composition of the present invention is also a part of the embodiment of the present invention.

<Use>

From the viewpoint that the refractive index of a cured material is low, and the adhesive strength to a member is excellent, the curable resin composition of the present invention can be used as an optical coating agent, a sealant, or an adhesive.

Specific examples of the optical coating agent, the sealant, and the adhesive, for which the curable resin composition of the present invention is used, include sealants and adhesives for a liquid crystal display, an organic electroluminescence, a light emitting diode display device, a field emission display, and the like in a flat panel display; sealants and adhesives for a video disk, a CD, a DVD, an MD, a pickup lens, a hard disk periphery (members for a spindle motor, members for a magnetic head actuator, and the like), a Blu-ray Disc, and the like, in a recording field; sealants and adhesives for an optical switch periphery in an optical communication system, an optical fiber material of an optical connector periphery, optical passive parts, optical circuit parts, a photoelectronic integrated circuit periphery, or the like, in an optical part field; sealants and adhesives for a camera module, a lens material for a still camera, a finder prism, a target prism, a finder cover, a light receiving sensor part, a photographing lens, a projection lens of a projection television, and the like, in an optical instrument field; and the like.

EXAMPLES

Hereinafter, the present invention is described in more detail with reference to Examples, however the present invention is not limited to these Examples.

<Preparation of Curable Resin Composition>

Example 1

100 parts by mass of (a1) a urethane methacrylate oligomer containing a perfluoropolyether skeleton in a molecule having a weight-average molecular weight of 1650 (FLUOROLINK MD700, manufactured by Solvay Specialty Polymers Japan K.K.) as the (A) component of the present invention, 0.5 parts by mass of (b1) dipentaerythritol hexaacrylate (KAYARAD DPHA, manufactured by Nippon Kayaku Co., Ltd.) as the (B) component, 8 parts by mass of (c1) methacrylic acid 2-hydroxypropyl (2-hydroxypropyl methacrylate; HPMA, manufactured by NIPPON SHOKUBAI CO., LTD.) as the (C) component, and 3 parts by mass of (d1) 1-hydroxy-cyclohexyl-phenyl-ketone: a photo-radical initiator as the (D) component were added and mixed by a mixer under light-shielding conditions at 25° C. for 60 minutes, thereby obtaining Example 1 as a curable resin composition in liquid form at 25° C.

Example 2

The preparation was carried out in a similar manner to Example 1, except that the content of the b1 component was changed from 0.5 part by mass to 1.0 parts by mass in Example 1, thereby obtaining Example 2 as a curable resin composition in liquid form at 25° C.

Example 3

The preparation was carried out in a similar manner to Example 1, except that the c1 component was changed to (c2) methacrylic acid 2-hydroxyethyl (2-hydroxyethyl methacrylate); LIGHT ESTER HO-250 (N), manufactured by KYOEISHA CHEMICAL Co., Ltd.) in Example 1, thereby obtaining Example 3 as a curable resin composition in liquid form at 25° C.

Example 4

The preparation was carried out in a similar manner to Example 1, except that the c1 component was changed to (c3) methacrylic acid 2-hydroxybutyl (4-hydroxybutyl methacrylate; LIGHT ESTER HOB, manufactured by KYOEISHA CHEMICAL Co., Ltd.) in Example 1, thereby obtaining Example 4 as a curable resin composition in liquid form at 25° C.

Example 5

The preparation was carried out in a similar manner to Example 1, except that the c1 component was changed to (c4) acryloyl morpholine (ACMO, manufactured by KJ Chemicals Corporation) in Example 1, thereby obtaining Example 5 as a curable resin composition in liquid form at 25° C.

Example 6

The preparation was carried out in a similar manner to Example 1, except that the c1 component was changed to (c5) acrylic acid (GA, manufactured by Mitsubishi Chemical Corporation.) in Example 1, thereby obtaining Example 6 as a curable resin composition in liquid form at 25° C.

Example 7

The preparation was carried out in a similar manner to Example 1, except that the c1 component was changed to (c6) isobornyl acrylate (IBX-A, manufactured by KYOEISHA CHEMICAL Co., Ltd.) in Example 1, thereby obtaining Example 7 as a curable resin composition in liquid form at 25° C.

Example 8

The preparation was carried out in a similar manner to Example 1, except that the b1 component was changed to (b2) a mixture of isocyanuric acid ethylene oxide-modified diacrylate and isocyanuric acid ethylene oxide-modified triacrylate (ARONIX M-313, manufactured by TOAGOSEI CO., LTD.) in Example 1, thereby obtaining Example 8 as a curable resin composition in liquid form at 25° C.

Comparative Example 1

The preparation was carried out in a similar manner to Example 1, except that the c1 component was changed to (c'1) lauryl acrylate in Example 1, thereby obtaining Comparative Example 1 as a curable resin composition in liquid form at 25° C.

Comparative Example 2

The preparation was carried out in a similar manner to Example 1, except that the c1 component was removed in Example 1, thereby obtaining Comparative Example 2 as a curable resin composition in liquid form at 25° C.

Comparative Example 3

The preparation was carried out in a similar manner to Example 2, except that the c1 component was removed in Example 2, thereby obtaining Comparative Example 3 as a curable resin composition in liquid form at 25° C.

Comparative Example 4

The preparation was carried out in a similar manner to Example 1, except that the a1 component was changed to (a'1) urethane diacrylate (UF-8001G, manufactured by KYOEISHA CHEMICAL Co., Ltd.) not containing a fluorine atom in a molecule having a weight-average molecular weight of 4500 in Example 1, thereby obtaining Comparative Example 4 as a curable resin composition in liquid form at 25° C.

Comparative Example 5

The preparation was carried out in a similar manner to Example 1, except that the b1 component was removed in Example 1, thereby obtaining Comparative Example 5 as a curable resin composition in liquid form at 25° C.

Comparative Example 6

The preparation was carried out in a similar manner to Example 1, except that the content of the b1 component was changed from 0.5 parts by mass to 8.0 parts by mass in Example 1, thereby obtaining Comparative Example 6 as a curable resin composition in liquid form at 25° C.

The test method used in Examples and Comparative Examples of Table 1 is as follows.

<Refractive Index of Cured Material>

Each curable resin composition was inserted between two peeling-off films made of polyethylene terephthalate and formed into a film shape using a 100-μm-thick spacer. Next, the resultant product was irradiated with ultraviolet rays (30 kJ/m$^2$) from an ultraviolet irradiation apparatus, whereby the curable resin composition between the films was cured. Then, the peeling-off films made of polyethylene terephthalate were removed, and the resultant product was used as a sample. Then, the refractive index of the cured material of each sample in an atmosphere of 25° C. was measured in accordance with JIS K0062: 1992 using an Abbe refractometer (a multi-wavelength Abbe refractometer DR-M2, manufactured by ATAGO CO., LTD.). In the present invention, the refractive index of the cured material is preferably 1.40 or less.

<Shear Adhesion Strength Test>

Each curable resin composition was applied onto a glass test piece (25 mm×100 mm×5 mm in thickness) and extended. Similarly, then, two glass test pieces were bonded together so that the bonded area of glass test pieces (25 mm×100 mm×5 mm in thickness) was 25 mm×10 mm. The bonded pieces fixed with jigs were irradiated with ultraviolet rays (30 kJ/m$^2$) from an ultraviolet irradiation apparatus and cured. After that, the tensile shear adhesion strength was measured using a universal tensile tester at a tensile rate of 50 mm/min. The results are shown in Table 1. The unit is [MPa]. The details of the test are based on JIS K6850: 1999. In the present invention, the tensile-shear adhesion strength of the cured material is preferably 1.2 MPa or more.

TABLE 1

|  | Refractive index of cured material | Shear adhesion strength |
| --- | --- | --- |
| Example 1 | 1.38 | 1.9 MPa |
| Example 2 | 1.38 | 2.1 MPa |
| Example 3 | 1.38 | 1.8 MPa |
| Example 4 | 1.38 | 1.9 MPa |
| Example 5 | 1.38 | 2.8 MPa |
| Example 6 | 1.38 | 4.5 MPa |
| Example 7 | 1.38 | 2.5 MPa |
| Example 8 | 1.38 | 2.7 MPa |
| Comparative Example 1 | 1.41 | 0.9 MPa |
| Comparative Example 2 | 1.37 | 0.7 MPa |
| Comparative Example 3 | 1.42 | 1.2 MPa |
| Comparative Example 4 | 1.49 | 3.5 MPa |
| Comparative Example 5 | 1.38 | 1.0 MPa |
| Comparative Example 6 | 1.42 | 5.2 MPa |

Examples 1 to 8 of Table 1 show that the present invention is a curable resin composition in which the refractive index of a cured material is low, and the adhesive strength to a member is excellent. Meanwhile, Comparative Example 1 is a curable resin composition obtained by using lauryl acrylate which is not the (C) component of the present invention, and it is found that the refractive index of the cured material is poor. Further, Comparative Examples 2 and 3 are curable resin compositions not containing the (c) component of the present invention, and it is found that the adhesive strength or the refractive index of each of the cured materials is poor. Further, Comparative Example 4 is a curable resin composition obtained by using urethane diacrylate not containing a fluorine atom which is not the (A) component of the present invention and it is found that the refractive index of the cured material is poor. Furthermore, Comparative Example 5 is a curable resin composition not containing the (B) component of the present invention, and it is found that the adhesive strength is poor. Comparative Example 6 is a curable resin composition to which an excessive amount of the (B) component of the present invention was added, and it is found that the refractive index of the cured material is poor.

INDUSTRIAL APPLICABILITY

Since the present invention is a curable resin composition in which the refractive index of a cured material is low, and the adhesive strength to a member is excellent, the curable resin composition can be used for various coatings, sealants, adhesives, and the like, and is effective, and therefore is industrially useful.

The present application is based on JP 2018-165221 filed on Sep. 4, 2018, the disclosure of which is incorporated herein by reference in its entirety.

The invention claimed is:

1. A curable resin composition comprising:
   (A) component: an oligomer containing a (meth)acryloyl group and a fluorine atom in a molecule;
   (B) component: polyfunctional (meth)acrylate not containing a fluorine atom in a molecule;
   (C) component: a compound, not containing a fluorine atom in a molecule, of at least one selected from the group consisting of monofunctional (meth)acrylate containing a hydroxyl group, monofunctional (meth)acrylate containing an alicyclic ring, monofunctional (meth)acrylate containing an aromatic ring, (meth)acrylamide, and (meth)acrylic acid; and
   (D) component: a radical initiator,
   wherein a content of the (B) component is 0.1 parts by mass or more and 7.8 parts by mass or less relative to 100 parts by mass of the (A) component,
   wherein a content of the (C) component is 3 parts by mass or more and 50 parts by mass or less, relative to 100 parts by mass of the (A) component, and
   wherein a content of the (C) component is 4 parts by mass or more and 100 parts by mass or less, relative to 1 part by mass of the (B) component.

2. The curable resin composition according to claim 1, wherein the (A) component is a urethane(meth)acrylate oligomer containing a fluorine atom in a molecule.

3. The curable resin composition according to claim 1, wherein the (A) component is a urethane(meth)acrylate oligomer containing a perfluoropolyether skeleton.

4. The curable resin composition according to claim 1, wherein the (B) component is (meth)acrylate having 2 to 6 (meth)acryloyl groups.

5. The curable resin composition according to claim 1, wherein the (B) component is at least one selected from the group consisting of neopentylglycol di(meth)acrylate, dicyclopentenyl di(meth)acrylate, alkylene oxide-modified bisphenol di(meth)acrylate, di(meth)acryloyl isocyanurate, isocyanuric acid ethylene oxide-modified di(meth)acrylate, isocyanuric acid propylene oxide-modified di(meth)acrylate, epoxy di(meth)acrylate, trimethylolpropane tri(meth)acrylate, trimethylolpropane propylene oxide-modified tri(meth)acrylate, pentaerythritol tri(meth)acrylate, isocyanuric acid ethylene oxide-modified tri(meth)acrylate, isocyanuric acid propylene oxide-modified tri(meth)acrylate, caprolactone-modified tris((meth)acryloxy ethyl)isocyanurate, glycerin tri(meth)acrylate, ditrimethylolpropane tetra(meth)acrylate, pentaerythritol tetra(meth)acrylate, dipentaerythritol monohydroxy penta(meth)acrylate, alkyl-modified dipentaerythritol pentaacrylate, and dipentaerythritol hexa(meth)acrylate.

6. The curable resin composition according to claim 1, wherein the (D) component is a photo-radical initiator.

7. The curable resin composition according to claim 1, wherein a refractive index of a cured material is 1.40 or less.

8. The curable resin composition according to claim 1, wherein the curable resin composition is an optical coating agent, a sealant, or an adhesive.

9. A cured material formed by curing the curable resin composition according to claim 1.

10. The curable resin composition according to claim 1, wherein the (B) component is one or more selected from the group consisting of dicyclopentenyl diacrylate, di(meth)acryloyl isocyanurate, isocyanuric acid ethylene oxide-modified di(meth)acrylate, isocyanuric acid propylene oxide-modified di(meth)acrylate, isocyanuric acid ethylene oxide-modified tri(meth)acrylate, isocyanuric acid propylene oxide-modified tri(meth)acrylate, ditrimethylolpropane tetra(meth)acrylate, and dipentaerythritol hexa(meth)acrylate.

11. The curable resin composition according to claim 1, wherein the (C) component is (meth)acrylamide, not containing a fluorine atom in a molecule.

12. The curable resin composition according to claim 1, wherein the (C) component is one or more selected from the group consisting of 2-hydroxyethyl (meth)acrylate, 2-hydroxypropyl(meth)acrylate, 4-hydroxybutyl(meth)acrylate, dimethyl(meth)acrylamide, diethyl(meth)acrylamide, and acryloyl morpholine.

13. The curable resin composition according to claim 1, wherein the content of the (B) component relative to 100 parts by mass of the (A) component is 0.3 parts by mass or more and 3.0 parts by mass or less.

14. A curable resin composition comprising:
(A) component: an oligomer containing a (meth)acryloyl group and a fluorine atom in a molecule;
(B) component: polyfunctional (meth)acrylate not containing a fluorine atom in a molecule;
(C) component: a compound, not containing a fluorine atom in a molecule, of at least one selected from the group consisting of monofunctional (meth)acrylate containing a hydroxyl group, monofunctional (meth)acrylate containing an alicyclic ring, monofunctional (meth)acrylate containing an aromatic ring, (meth)acrylamide, and (meth)acrylic acid; and
(D) component: a radical initiator,
wherein a content of the (B) component is 0.1 parts by mass or more and 7.8 parts by mass or less relative to 100 parts by mass of the (A) component,
wherein the (B) component is one or more selected from the group consisting of dicyclopentenyl diacrylate, di(meth)acryloyl isocyanurate, isocyanuric acid ethylene oxide-modified di(meth)acrylate, isocyanuric acid propylene oxide-modified di(meth)acrylate, isocyanuric acid ethylene oxide-modified tri(meth)acrylate, isocyanuric acid propylene oxide-modified tri(meth)acrylate, ditrimethylolpropane tetra(meth)acrylate, and dipentaerythritol hexa(meth)acrylate.

15. The curable resin composition according to claim 14, wherein the (C) component is a compound, not containing a fluorine atom in a molecule, of at least one selected from the group consisting of monofunctional (meth)acrylate containing a hydroxyl group, monofunctional (meth)acrylate containing an alicyclic ring, and (meth)acrylamide.

16. The curable resin composition according to claim 14, wherein the (C) component is (meth)acrylamide, not containing a fluorine atom in a molecule.

17. The curable resin composition according to claim 14, wherein the (C) component is one or more selected from the group consisting of 2-hydroxyethyl (meth)acrylate, 2-hydroxypropyl(meth)acrylate, 4-hydroxybutyl(meth)acrylate, dimethyl(meth)acrylamide, diethyl(meth)acrylamide, and acryloyl morpholine.

18. The curable resin composition according to claim 14, wherein a content of the (B) component relative to 100 parts by mass of the (A) component is 0.3 parts by mass or more and 3.0 parts by mass or less and,
wherein a content of the (C) component is 3 parts by mass or more and 50 parts by mass or less, relative to 100 parts by mass of the (A) component.

19. A cured material formed by curing the curable resin composition according to claim 14.

* * * * *